(No Model.)  2 Sheets—Sheet 1.
P. PATTERSON.
APPARATUS FOR WELDING TUBING.
No. 341,162. Patented May 4, 1886.
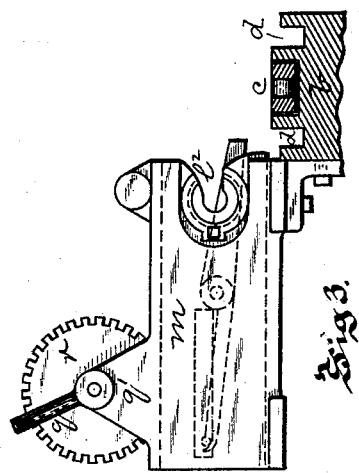
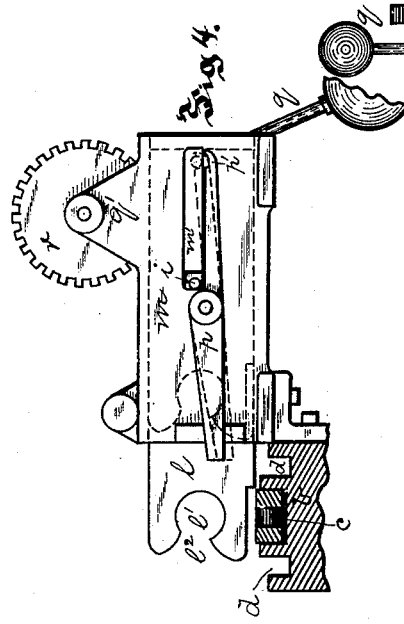
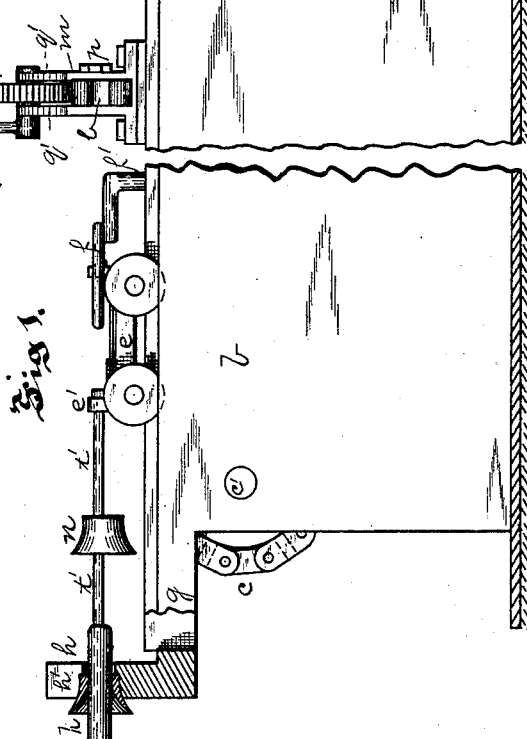
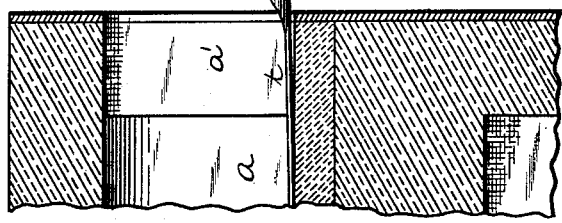
Witnesses:
Jn Cooke
J. C. Barnes
Inventor.
Peter Patterson
By James J. Kay
Attorney (No Model.) 2 Sheets—Sheet 2.
P. PATTERSON.
APPARATUS FOR WELDING TUBING.
No. 341,162. Patented May 4, 1886.
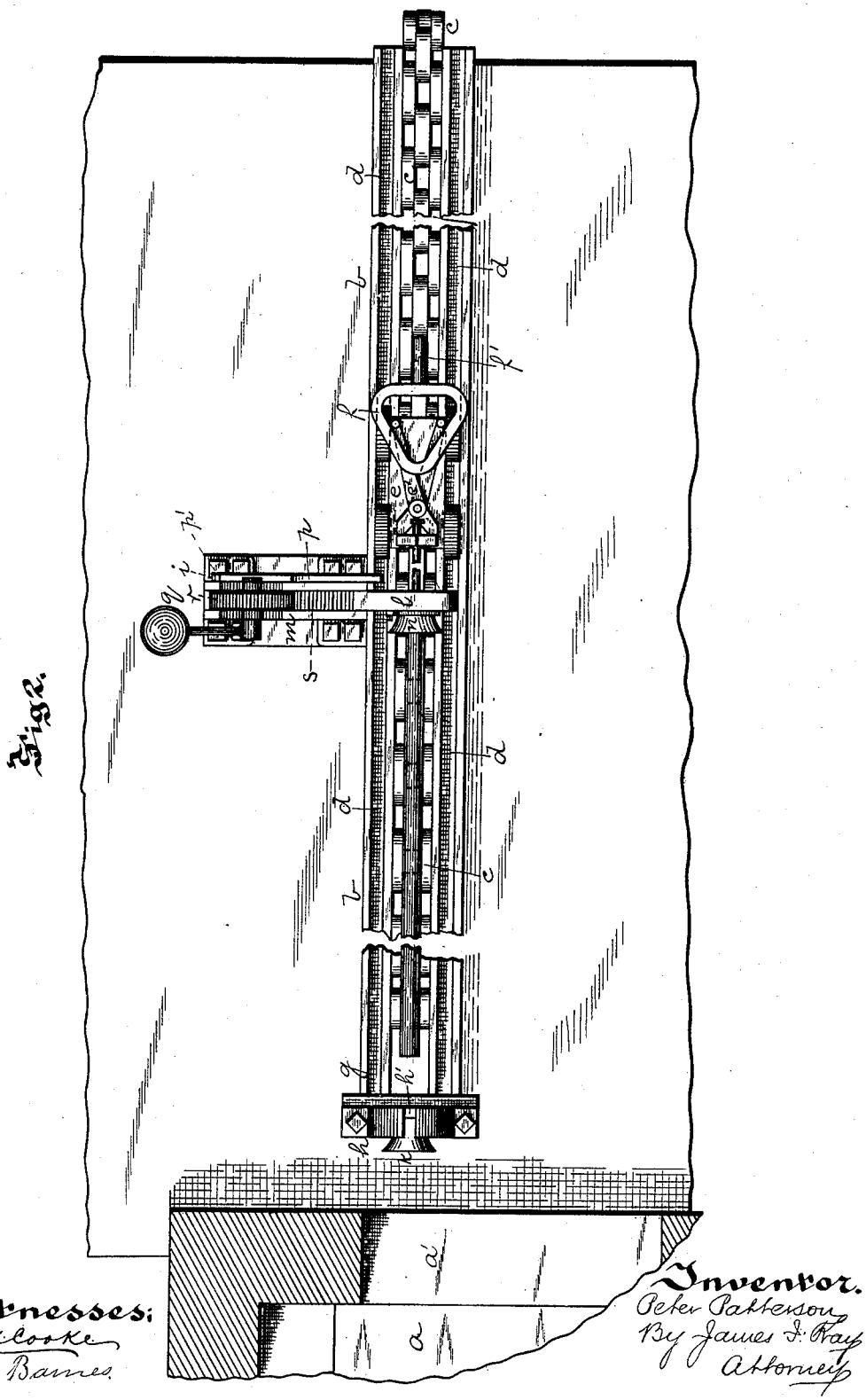

UNITED STATES PATENT OFFICE.

PETER PATTERSON, OF McKEESPORT, PENNSYLVANIA, ASSIGNOR OF ONE-HALF TO THE NATIONAL TUBE WORKS COMPANY, OF SAME PLACE.

APPARATUS FOR WELDING TUBING.

SPECIFICATION forming part of Letters Patent No. 341,162, dated May 4, 1886.

Application filed September 12, 1885. Serial No. 176,861. (No model.)

*To all whom it may concern:*

Be it known that I, PETER PATTERSON, of McKeesport, in the county of Allegheny and State of Pennsylvania, have invented a new and useful Improvement in Apparatus for the Manufacture of Butt-Weld Tubing; and I do hereby declare the following to be a full, clear, and exact description thereof.

My invention relates to the manufacture of what is termed "butt-weld tubing," this tubing being formed from plate metal and bent to tubular shape and its meeting edges welded together in suitable dies.

The most approved method of making this butt-weld tubing heretofore practiced has been to weld a rod at the end of the plate from which the tube is to be formed and turn the sides of the plate at that end over the rod and weld them thereto. The plate was then brought to a welding-heat in a suitable furnace, and drawn by means of the rod welded thereto through a bell-shaped die, generally termed a "bell," the sides of the plates being gradually turned over, and its edges butted and compressed together within the bell and so welded. It was then reheated two or more times and drawn through a reducing-bell, having a smaller passage, after each reheating, to weld the edges more perfectly and size and compact the metal, so improving the metal of the tube by working and reducing it. Though the subsequent reduction and compacting of the metal improves its quality, yet the subsequent reheatings of the tube necessarily detracts from the quality of the metal, often burning it and wastes it by oxidizing or "scaling," so that the plate from which the tube is formed is necessarily made slightly wider for each reheating to which the tube is subjected. The reinsertion of the tube into the furnace for the several reheatings requires time, and is laborious for the welder, as he has to run back with the tube in order to reinsert it. He is also compelled to leave the furnace in so doing, and cannot watch the heating of the metal as carefully as desirable. To overcome these difficulties efforts have been made to dispense with the reheatings by employing double bells, or two or more bells in line with each other, through which the tube is drawn with one operation, being brought to shape and welded in the first bell and more perfectly welded and reduced in the subsequent bell or bells; but it is found that the friction of the several bells in line is so great as to stretch and in some cases tear the metal as it is drawn through the bells, and frequently cause the parting of the pulling rod or tag from the tube, the metal of the tube being soft and ductile when at a welding-heat.

My invention has for its object to overcome these objections; and it consists, essentially, in combining with the bell-die slipping over the drawing-rod welded to the blank a movable bell-holder passing across the course of the drawing-rod and intercepting and supporting the bell-die while the blank is drawn through the same, the apparatus being generally intended for use with the draw-bench having the ordinary stationary bell-holder at its forward end for supporting a welding-bell, my improved apparatus being located at about the center of the same draw-bench and the blank being drawn through the welding-bell supported in the stationary bell-holder, and the tube thus formed, and, by a continuous drawing operation, subsequently drawn through the reducing-bell, which is intercepted and supported by the movable bell-holder, so that the tube is both welded and reduced at a continuous operation, undue friction of the metal overcome, the labor of the welder reduced, and the capacity of the furnace largely increased.

It also consists in means for operating this movable bell-holder automatically.

To enable others skilled in the art to make and use my invention, I will describe its construction and operation, referring to the accompanying drawings, in which—

Figure 1 is a side view illustrating my improved apparatus. Fig. 2 is a top view of the same. Figs. 3 and 4 are views of the movable bell-holder and the apparatus for operating it.

Like letters of reference indicate like parts in each.

Mounted in front of the furnace *a* is the draw-bench *b*, this bench having the endless traveling chain *c*, mounted therein on suitable sprocket-wheels, *c'*, the draw-bench being about twice the length of the ordinary bench, for the reason that the tube is drawn twice on the same bench, the second drawing operation being after the first one is completed. The draw-bench has on each side of the chain the track $d$, on which track the drawing-buggy $e$ travels, this buggy being provided with the tongs $e'$, which grasp the tag or drawing-rod secured to the blank to be formed into tubing. Fitting over lugs on the arms of the tongs is the triangular link $f$, which has the bar $f'$, extending down therefrom and entering the spaces within the chain $c$, and so connecting the buggy thereto, the drawing strain on the link causing the jaws of the tongs to grasp the drawing-rod and draw back the blank secured thereto.

At the forward end of the draw-bench, opposite the door $a'$ of the furnace, is the bell-stand $g$, to which is secured the ordinary stationary bell-holder $h$, this bell-holder having a recess corresponding to the outer shape of the welding-bell $k$, and having a slot, $h'$, at the top, through which the drawing-rod is dropped, as hereinafter described.

Supported on the draw-bench, at about the center thereof, is the movable bell-holder $l$, which slides within a box, $m$, bolted on the draw-bench, this bell-holder having a seat or recess, $l'$, corresponding to the outer shape of the reducing-bell $n$, and at its outer end a slot, $l^2$, which permits this bell-holder to pass over the drawing-rod into proper position to intercept the reducing-bell, the bell entering the seat $l'$ therein and being held thereby while the tube is drawn through the bell.

In one side of the box $m$ is the slot $m'$, within which the pin $i$ on the bell-holder moves, and pivoted on the side of the box is the lever $p$, at the rear end of which is the seat $p'$, for the reception of the pin $i$ on the bell-holder, the pin entering this seat and so holding the bell-holder within its box. The forward end of the lever $p$ extends out beyond the box above the track $d$ in the course of the wheel of the buggy, and as the buggy is drawn back along the track its wheel passes under the forward end of this lever extending beyond the box and raises it, so freeing the pin $i$ from the seat $p'$ and leaving the bell-holder $l$ free to advance. The bell-holder may be forced forward by any suitable mechanism, that shown being a weighted lever, $q$, mounted in bearings $q'$ on the top of the box, a pinion, $r$, being secured to the shaft of the lever between the bearings $q'$, and this pinion gearing into a rack, $s$, on the upper surface of the bell-holder $l$. When the bell-holder is drawn back into the box $m$ and held therein by the lever $p$, the pin $i$ being caught in the seat $p'$ thereof, the lever $q$ is raised to the position shown in Figs. 1 and 3; but as soon as the pin is freed from the lever $p$ the weighted lever falls, and the pinion $r$, working in the rack $s$, forces the bell-holder out into position to intercept and receive the reducing-bell and hold it while the tube is drawn through it, as shown in Figs. 2 and 4.

When my improved apparatus is employed, the blank formed of the plate $t$, having the tag or drawing-rod $t'$ welded thereto, is placed in the furnace $a$ and brought to the proper heat for welding, and as soon as the welder sees that it is about ready he takes the two bells $k$ and $n$ and slips them over the rod $t'$, the welding-bell $k$ being in front of the bell-holder $h$ and the reducing-bell $n$ back of said bell-holder. When the exact heat desired is obtained the welder drops the drawing-rod through the slot $h'$ of the bell-holder $h$, and the rod is grasped by the buggy $e$, which is connected to the endless chain, as before described, and as the blank is drawn back the welding-bell $k$ is first drawn into its seat in the bell-holder $h$, and the blank then drawn through the bell, thus turning up the plate into tubular form and butting and welding its edges, the reducing-bell hanging loosely on the drawing-rod during this operation. When the blank is drawn through this welding-bell, it is still drawn back by the buggy, which then trips the lever $p$ and frees the bell-holder $l$, this bell-holder being then advanced by the weighted lever into the course of the blank passing across the drawing-rod between the buggy and the reducing-bell into position to catch the bell and hold it as the tube is drawn through it. The pass of the bell $n$ is slightly smaller in diameter than that of the bell $k$, and the blank is brought to tubular form and receives its initial weld in this bell while it is further compacted and welded in the bell $n$, and sized and finished therein, receiving its second drawing-pass so soon after leaving the furnace that the metal is still at a high welding-heat, and a heavy pressure can be applied to the metal to weld and compact it. The operation is continuous and automatic, so that it is much more rapid than where the tube, after the first weld, is fed to a separate draw-bench, and yet there is no great strain on the metal of the tube, the first drawing operation being completed before the second drawing operation commences. I am thus enabled to subject the metal to two drawing-passes and form more perfect tubing at one heat and on a single draw-bench, requiring only the employment of one set of operators, thus increasing the output and decreasing the expense of manufacture.

It is evident that my improved bell-holder may, if desired, be employed at the forward end of the draw-bench, and when so employed it is included within my invention.

What I claim as my invention, and desire to secure by Letters Patent, is—

1. In apparatus for the manufacture of butt-weld tubing, the combination, with a bell-die slipping over the drawing-rod welded to the blank, of a movable bell-holder caused to pass across the course of the drawing-rod and intercepting and supporting the bell-die, substantially as and for the purposes set forth.

2. In apparatus for the manufacture of butt-weld tubing, the combination of a draw-bench, a welding-die supported at the forward end thereof, a reducing-die carried upon the drawing-rod, and apparatus for intercepting and supporting the reducing-die, substantially as and for the purposes set forth.

3. In apparatus for the manufacture of butt-weld tubing, a movable bell-holder adapted to pass across the course of the drawing-rod and intercept and support the bell-die, in combination with means for advancing the bell-holder, substantially as and for the purposes set forth.

4. In apparatus for the manufacture of butt-weld tubing, the combination of the draw-bench, the stationary bell-holder at the forward end thereof, the movable bell-holder supported on the draw-bench back of the stationary bell-holder, and the bell-dies, substantially as and for the purposes set forth.

5. In apparatus for the manufacture of butt-weld tubing, the combination of the box or support $m$, sliding bell-holder $l$, and the tripping-lever $p$, substantially as and for the purposes set forth.

6. The combination of the box or support $m$, sliding bell-holder $l$, weighted lever $q$, and connections between it and the bell-holder for advancing the bell-holder, substantially as set forth.

7. The combination of the box or support $m$, sliding bell-holder $l$, having the rack $s$ thereon, and lever carrying the pinion $r$, substantially as and for the purposes set forth.

In testimony whereof I, the said PETER PATTERSON, have hereunto set my hand.

PETER PATTERSON.

Witnesses:
JAMES I. KAY,
JAS. K. EASTWOOD.